United States Patent
Bernhard et al.

(10) Patent No.: US 10,508,605 B2
(45) Date of Patent: Dec. 17, 2019

(54) METHOD AND CONTROL SYSTEM FOR OPERATING A TURBOCHARGED INTERNAL COMBUSTION ENGINE OF A MOTOR VEHICLE

(71) Applicant: MTU FRIEDRICHSHAFEN GMBH, Friedrichshafen (DE)

(72) Inventors: Alexander Bernhard, Meckenbeuren (DE); Wolfgang Fimml, Hörbranz (AT)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 226 days.

(21) Appl. No.: 15/544,953

(22) PCT Filed: Nov. 5, 2016

(86) PCT No.: PCT/EP2016/000071
§ 371 (c)(1),
(2) Date: Jul. 20, 2017

(87) PCT Pub. No.: WO2016/116265
PCT Pub. Date: Jul. 28, 2016

(65) Prior Publication Data
US 2018/0016996 A1     Jan. 18, 2018

(30) Foreign Application Priority Data
Jan. 23, 2015  (DE) .......... 10 2015 201 191

(51) Int. Cl.
*F02D 41/00* (2006.01)
*F02D 41/24* (2006.01)

(52) U.S. Cl.
CPC ..... *F02D 41/0007* (2013.01); *F02D 41/2416* (2013.01)

(58) Field of Classification Search
CPC .. F02D 41/0007; F02D 41/10; F02D 41/2416; F02D 41/2422; F02D 19/0647;
(Continued)

(56) References Cited

U.S. PATENT DOCUMENTS

| 4,520,783 A | 6/1985 | Matsushita et al. |
| 6,085,717 A | 7/2000 | Kamura et al. |

(Continued)

FOREIGN PATENT DOCUMENTS

| DE | 0205961 A2 | 12/1986 |
| DE | 102005001962 A1 | 7/2006 |

(Continued)

*Primary Examiner* — Thai Ba Trieu
(74) *Attorney, Agent, or Firm* — Lucas & Mercanti, LLP; Klaus P. Stoffel

(57) ABSTRACT

A method for operating an internal combustion engine having a turbocharger, wherein a fuel quantity is supplied to the combustion chamber of the engine in a stationary state, which fuel quantity is determined according to a first predetermined relationship between a load requirement to the engine and a rating determining a fuel quantity to be supplied to the combustion chamber, wherein a second predetermined relationship between the rating and the load requirement is used, wherein according to the second relationship, a given load requirement is assigned a larger quantity of fuel than according to the first relationship. In a transient state of the engine, the fuel quantity supplied to the combustion chamber is determined based on an interpolated value of the rating, which is determined for the rating by an interpolation between a value resulting from the first relationship and a value resulting from the second relationship.

10 Claims, 2 Drawing Sheets

(58) Field of Classification Search
CPC . F02D 41/0027; F02D 41/0097; Y02T 10/144
USPC ........ 60/601, 603, 605.1; 701/104; 123/305, 123/436
See application file for complete search history.

(56) References Cited

U.S. PATENT DOCUMENTS

| | | | |
|---|---|---|---|
| 7,367,308 B2 * | 5/2008 | Kuo | ................... F02D 41/0052 |
| | | | 123/305 |
| 2012/0029795 A1 | 2/2012 | Surnilla et al. | |
| 2016/0215723 A1 * | 7/2016 | Thomas | .............. F02D 41/0097 |

FOREIGN PATENT DOCUMENTS

| | | | |
|---|---|---|---|
| DE | 102004005751 B4 | 3/2008 | |
| EP | 1255031 A2 | 11/2002 | |

* cited by examiner

METHOD AND CONTROL SYSTEM FOR OPERATING A TURBOCHARGED INTERNAL COMBUSTION ENGINE OF A MOTOR VEHICLE

The present application is a 371 of International application PCT/EP2016/000071, filed Jan. 15, 2016, which claims priority of DE 10 2015 201 191.7, filed Jan. 23, 2015, the priority of these applications is hereby claimed and these applications are incorporated herein by reference.

BACKGROUND OF THE INVENTION

The invention relates to a method for operating an internal combustion engine, a control device, configured for carrying out a method of this type, an internal combustion engine having a control device of this type, and a motor vehicle having an internal combustion engine of this type.

In particular in the case of internal combustion engines which are operated with combustion gas as fuel, a lean operating mode is frequently provided for reducing emissions, wherein the internal combustion engine is operated with a large air excess and a correspondingly low fuel mass. This is counter-productive in particular in the case of supercharged internal combustion engines with respect to a load shifting capability, since in the lean operating mode only a comparatively small exhaust gas mass flow is formed which can only accelerate the turbocharger insufficiently. The dynamic response behavior of said turbocharger is slowed down as a result, which ultimately also slows down the dynamic response behavior of the entire internal combustion engine.

SUMMARY OF THE INVENTION

The invention is based on the object of providing a method for operating an internal combustion engine having a turbocharger, a control device, configured for carrying out a method of this type, an internal combustion engine having a control device of this type and a motor vehicle having an internal combustion engine of this type, wherein the specified disadvantages do not occur.

The object is achieved, in particular, in that a method for operating an internal combustion engine having at least one turbocharger is provided, in which method a quantity of fuel according to a first predetermined relationship between a load requirement made of the internal combustion engine and a rated variable which determines the quantity of fuel to be fed to the combustion chamber is fed to at least one combustion chamber of the internal combustion engine in a steady state, wherein a second predetermined relationship between the rated variable and the load requirement is used, wherein according to the second relationship of a given load requirement a larger quantity of fuel is assigned than according to the first relationship, wherein the quantity of fuel fed to the combustion chamber is determined in a transient state of the internal combustion engine on the basis of an interpolated value of the rated variable by interpolation between a value for the rated variable, resulting from the first relationship, and a value for the rated variable, resulting from the second relationship. The fact that a given load requirement according to the second relationship is assigned a larger quantity of fuel than according to the first relationship means that according to the specifications the combustion chamber is fed a larger quantity of fuel if the rated variable is obtained according to the second relationship, with the result that according to the second relationship the internal combustion engine is operated with a relatively rich mixture, wherein a smaller quantity of fuel is fed to the combustion chamber if the rated variable is obtained according to the first relationship, in which case, given a fixed load requirement, the internal combustion engine is operated with a leaner mixture than according to the second relationship. The internal combustion engine can therefore be operated in the lean operating mode in a steady state, in particular in order to reduce emissions. In the transient state, enrichment of the mixture in the at least one combustion chamber can be brought about by interpolation between values of the rated variable which result from the first and the second relationship, as a result of which the mass of exhaust gas is increased and therefore the dynamic response behavior of the turbocharger and therefore also of the internal combustion engine is improved overall.

A "transient state" in the sense of the method is here, in particular, a state in which a load requirement made of the internal combustion engine and/or a rotational speed of the internal combustion engine is/are increased. In order to accelerate the reaction of the internal combustion engine to the increasing load requirement and/or to increase the rotational speed of the internal combustion engine more quickly, according to the method the mixture in the combustion chamber is enriched, with the result that the mass of exhaust gas is increased, causing the dynamic response behavior of the turbocharger to be improved.

The load requirement made of the internal combustion engine is preferably represented as a torque which is demanded from the internal combustion engine or which the internal combustion engine provides. In particular, a torque of the internal combustion engine is preferably used as a load requirement within the scope of the method.

The first relationship is preferably between a load requirement made of the internal combustion engine, a rotational speed of the internal combustion engine and the rated variable. In particular, the first relationship preferably represents the rated variable as a function of the load requirement and the rotational speed. What has been stated here about the first relationship preferably applies identically to the second relationship.

Accordingly, particularly preferably a larger quantity of fuel is assigned to a given load requirement and a given rotational speed according to the second relationship than according to the first relationship.

Within the scope of the method, the internal combustion engine is preferably operated with a combustion gas as fuel. In particular, preferably a gas engine is operated, particularly preferably a lean gas engine, which in steady states is driven in the lean operating mode. The advantages of the method are implemented in a particular way in this context. The combustion gas can be fed to the at least one combustion chamber of the internal combustion engine by means of intake manifold injection, in particular as cylinder-specific intake manifold injection, as single point injection into a charge air section of the internal combustion engine, in particular upstream of a charge air compressor, or as direction injection directly into the combustion chamber. In this context, the quantity of combustion gas which is fed to the combustion chamber is preferably determined by a combustion gas valve which is arranged in a combustion gas line and is actuated as a function of the rated variable. In this context, it is possible, in particular, that a lambda setpoint value, that is to say a setpoint value for the combustion air ratio, also referred to as the air ratio or air coefficient, is used as rated variable. This dimensionless coefficient indicates the mass ratio of air and fuel in a combustion process. In this context, the value 1 corresponds to a stoichiometric combustion air ratio, consequently to complete combustion, while values less than 1 characterize a rich mixture and values greater than 1 characterize a lean mixture.

An embodiment of the method is preferred which is distinguished by the fact that the first relationship between the load requirement and preferably the rotational speed and the rated variable is optimized with respect to reduced, in particular the lowest possible, emissions of the internal combustion engine. The first relationship is therefore established in order to implement a lean operating mode of the internal combustion engine and to operate the internal combustion engine with the lowest possible emissions.

Alternatively or additionally, there is preferably provision that the second relationship between the load requirement and preferably the rotational speed and the rated variable represents a knocking limit of the internal combustion engine. This means that the values of the rated variable which according to the second relationship are stored as a function of the load requirement and preferably as a function of the rotational speed are selected in such a way that during dimensioning of the quantity of fuel which is fed to the combustion chamber according to the second relationship the internal combustion engine just avoids knocking. The internal combustion engine would therefore start to knock when the load requirement is fixed and preferably when the rotational speed is fixed if a larger quantity of fuel would be fed to the combustion chamber than is predefined by the rated variable determined according to the second relationship. This configuration of the second relationship is advantageous because the internal combustion engine can in this way be operated with maximum enrichment without risk of damage as a result of knocking, with the result that a maximum mass flow of exhaust gas can be made available to the turbocharger for a given load requirement and preferably given rotational speed. The dynamic response behavior of the internal combustion engine is then improved in an optimum way.

An embodiment of the method is also preferred which is distinguished by the fact that a characteristic diagram in which values for the rated variable are stored as a function of the rotational speed and the torque of the internal combustion engine is used as a first relationship. This constitutes a particularly easily implementable configuration of the first relationship.

Alternatively or additionally, a characteristic diagram in which values for the rated variable are stored as a function of a rotational speed and a torque of the internal combustion engine is preferably used as a second relationship. In this way, a particularly easily implementable configuration is also obtained for the second relationship.

An embodiment of the method is preferred which is distinguished by the fact that the interpolation between the first and second relationships is carried out as a function of a differential rotational speed. The differential rotational speed is calculated as the difference between a setpoint rotational speed and an instantaneous actual rotational speed of the internal combustion engine. A transient state in the sense of the method is in this case characterized in particular by the fact that the instantaneous actual rotational speed of the internal combustion engine differs from a setpoint prescription for the rotational speed, in particular the setpoint rotational speed is higher than the instantaneous actual rotational speed, with the result that the internal combustion engine has to be accelerated to the setpoint rotational speed. Such rotational speed prescriptions can be found, for example, in internal combustion engines which are provided for driving a watercraft, in particular a ship, wherein a setpoint rotational speed for the internal combustion engine is predefined directly by a skipper by means of a control lever. If interpolation is carried out as a function of the differential rotational speed, this permits flexible enrichment of the mixture as a function of the actual distance between the instantaneous actual rotational speed and the setpoint rotational speed. It is possible, in particular here, to enrich the mixture to a smaller degree in the case of a relatively small deviation than in the case of a relatively large deviation. The dynamic response behavior of the internal combustion engine is therefore controlled according to demand, which, in particular, saves fuel and keeps emissions as low as possible, despite the enrichment. The interpolation is preferably carried out according to the following equation:

$$BG_{int} = BG_1 + g(BG_2 - BG_1) \qquad (1)$$

Here, $BG_{int}$ is the interpolated value of the rated variable, $BG_1$ is the value obtained for the rated variable according to the first relationship, $BG_2$ is the value obtained for the rated variable according to the second relationship, and g is an interpolation factor which has a value range from at least 0 to a maximum 1, wherein the value of the interpolation factor is determined as a function of the differential rotational speed.

According to equation (1) it is obvious that the interpolated value $BG_{int}$ of the rated variable is equal to the value $BG_1$ determined on the basis of the first relationship if the interpolation factor g has the value 0. If the interpolation factor g has the value 1, the interpolated value $BG_{int}$ of the rated variable is equal to the value $BG_2$ determined for the rated variable according to the second relationship.

The interpolation factor is preferably read out from a first characteristic curve, wherein the first characteristic curve has values of the interpolation factor g as a function of the differential rotational speed.

In one preferred embodiment of the method there is provision that the profile of the characteristic curve is steep, wherein the characteristic curve rises from the value 0 to the value 1 particularly preferably within a differential rotational speed range which extends from at least 5 rpm to a maximum 20 rpm, preferably from at least 10 rpm to a maximum 15 rpm.

A rise in the characteristic curve is particularly preferably already provided at low differential rotational speeds. In particular it is possible that the value of the interpolation factor g is equal to 0 in a differential rotational speed range from 0 rpm to a starting differential rotational speed which is from at least 5 rpm to a maximum 10 rpm, wherein the value 1 for the interpolation factor g is reached at a differential rotational speed of preferably 20 rpm.

A steep first characteristic curve permits here a particularly dynamic response of the turbocharger and also of the internal combustion engine as a whole.

An embodiment of the method is also preferred which is distinguished by the fact that a lambda setpoint value is used as a rated variable for the internal combustion engine. This is particularly favorable for the operation of an internal combustion engine which is embodied as a gas engine because in such an internal combustion engine the quantity of fuel which is to be fed to the combustion chamber is typically controlled in any case by means of a lambda setpoint value. In this context, the lambda setpoint value is preferably used to actuate a fuel valve, in particular a combustion gas valve which defines the quantity of fuel to be fed to the combustion chamber. However, the fuel valve is preferably not actuated directly with the lambda setpoint value but instead the latter is previously converted into another variable which is suitable for actuating the combustion gas valve, for example into a combustion gas mass flow or into a mass of combustion gas which is to be fed per stroke of a piston assigned to the combustion chamber.

An embodiment of the method is also preferred in which in a transient state an ignition time of the internal combustion engine is adjusted in the retarded direction by interpolation between a first predetermined ignition time relationship, which is configured between an ignition time of the internal combustion engine and a load requirement, as well as preferably a rotational speed, of the internal combustion engine, and a second predetermined ignition time relationship, which is also configured between an ignition time of the internal combustion engine and a load requirement, as well as preferably a rotational speed, of the internal combustion engine. There is therefore in particular provision that in the transient state of the internal combustion engine the ignition time is determined by interpolation between an ignition time obtained according to the first ignition time relationship and an ignition time obtained according to the second ignition time relationship. Adjusting the ignition time in the retarded direction shifts the knocking limit of the internal combustion engine, with the result that a larger quantity of fuel can be fed to the combustion chamber without a risk of knocking. The internal combustion engine can therefore be operated with an even richer mixture in the transient state if the ignition time is adjusted in the retarded direction. Therefore, the mass flow of exhaust gas which is applied to the turbocharger can be increased even further, as a result of which the dynamic response behavior of the turbocharger and also the internal combustion engine itself can also be improved even further.

In this context, an ignition time which is determined at a given load requirement and preferably at a given rotational speed according to the first ignition time relationship occurs earlier than an ignition time which is determined according to the second ignition time relationship. Therefore, as a result of the interpolation an adjustment in the retarded direction is always brought about and additional enrichment of the mixture in the combustion chamber is made possible.

The first ignition time relationship is preferably optimized with respect to reduced, in particular the lowest possible, emissions of the internal combustion engine. Alternatively or additionally, the second ignition time relationship is preferably adjusted to a technical limitation for the adjustment of the ignition time in the retarded direction and represents, in particular, a technically possible limit for the adjustment of the ignition time in the retarded direction. In particular, it is possible for the second ignition time relationship to represent a knocking limit of the internal combustion engine with respect to the ignition time, wherein the internal combustion engine would knock when the ignition time were selected to be later than is the case with a given load requirement and preferably given rotational speed according to the second ignition time relationship.

A characteristic diagram in which values for the ignition time are stored as a function of a rotational speed and a torque of the internal combustion engine is preferably used as a first ignition time relationship. Alternatively or additionally, a characteristic diagram in which values for the ignition time are stored as a function of the rotational speed and the torque of the internal combustion engine is preferably used for the second ignition time relationship.

The interpolation with respect to the ignition time is preferably also carried out as a function of the differential rotational speed which is calculated as the difference between a setpoint rotational speed and an instantaneous actual rotational speed of the internal combustion engine.

In particular, the interpolation of the ignition time preferably takes place according to the following equation:

$$ZZP_{int}=ZZP_1+h(ZZP_2-ZZP_1) \quad (2)$$

In this context, $ZZP_{int}$ is the interpolated value for the ignition time, $ZZP_1$ is a value determined for the ignition time according to the first ignition time relationship, $ZZP_2$ denotes a value determined for the ignition time according to the second ignition time relationship, and h is an ignition time interpolation factor which has a value range from at least 0 to a maximum 1, wherein said interpolation factor is preferably given as a function of the differential rotational speed. In particular, the ignition time interpolation factor h is preferably determined on the basis of a second characteristic curve which has values for the ignition time interpolation factor h as a function of the differential rotational speed. In this context, according to equation (2) it is obvious that the interpolated ignition time $ZZP_{int}$ is equal to the ignition time $ZZP_1$ determined according to the first ignition time relationship if the ignition time interpolation factor h has the value 0, wherein it is equal to the ignition time $ZZP_2$ determined according to the second ignition time relationship if the ignition time interpolation factor h has the value 1.

It is possible for the same characteristic curve to be used as a first characteristic curve and as a second characteristic curve. However, an embodiment of the method is preferred in which the second characteristic curve is selected to be different than the first characteristic curve, wherein, in particular, a starting value for the differential rotational speed from which values for the ignition time interpolation factor h differ from 0 is shifted to higher differential rotational speeds compared to the first characteristic curve.

In particular, it is possible that a rise of the second characteristic curve does not start until a differential rotational speed of 20 rpm. An embodiment of the method is preferred in which a gradient of the second characteristic curve is identical to a gradient of the first characteristic curve, with the result that the difference between the characteristic curves is limited to purely a displacement of the second characteristic curve to higher differential rotational speeds. Alternatively, it is, however, also possible for the second characteristic curve also to have a gradient which is different than the gradient of the first characteristic curve, in which case it rises, in particular, less steeply than the first characteristic curve. Both a displacement of the second characteristic curve to higher differential rotational speeds and a reduction in the gradient of the second characteristic curve compared to the first characteristic curve has the effect that the displacement of the ignition time does not become effective until when there are relatively large differences between the actual rotational speed and the setpoint rotational speed. This ultimately leads to a situation in which increased dynamics of the internal combustion engine are made available only when they are actually necessary, in order to compensate comparatively large rotational speed differences as quickly as possible. In the case of small rotational speed differences it is possible in this way to save fuel, while at the same time the emissions of the internal combustion engine also become lower than if the first characteristic curve and the second characteristic curve were the same.

In particular, an embodiment of the method is preferred in which, in addition to the adjustment of the ignition time in the retarded direction, an additional rated variable term is combined by computation with the interpolated value of the rated variable, wherein the additional rated variable term is calculated on the basis of scaling of a rated variable differential value between a value for the rated variable, which results from a predetermined third relationship, and the value of the rated variable, which results from the second relationship, wherein the third relationship is in turn configured between a load requirement, and preferably a rotational speed, of the internal combustion engine and the rated variable. By means of the additional rated variable term it is possible additionally to enrich the mixture in the combustion chamber by feeding in further fuel and in this way to utilize the displacement of the knocking limit in the retarded direction on the basis of the displacement of the ignition time. The additional rated variable term can additively or multiplicatively be combined with the interpolated value of the rated variable.

In this context there is provision, in particular, that a larger quantity of fuel is assigned to a given load requirement, and preferably a given rotational speed, according to the third relationship than according to the second relationship.

In this context, the third relationship preferably represents a knocking limit of the internal combustion engine at the ignition time adjusted in the retarded direction according to the second ignition time relationship. In a corresponding fashion, the second relationship preferably represents the knocking limit of the internal combustion engine at the ignition time determined according to the first ignition time relationship, wherein the first ignition time relationship is preferably used to determine the ignition time in all the states of the internal combustion engine in which no interpolation takes place between the first ignition time relationship and the second ignition time relationship, and that is to say in particular in steady states and preferably also in transient states which involve a load shedding or a reduction in the setpoint rotational speed. The rated variable is therefore preferably selected according to the third relationship in such a way that the internal combustion engine at a given load requirement and preferably given rotational speed just avoids knocking if the quantity of fuel determined by the rated variable is fed to the combustion chamber. In contrast, the internal combustion engine starts to knock if at a given load requirement and preferably given rotational speed a larger quantity of fuel is fed in than corresponds to the rated variable according to the third relationship at the ignition time which is adjusted in the retarded direction.

The additional rated variable term is preferably determined according to the following equation:

$$\Delta BG = k(BG_3 - BG_2) \tag{3}$$

In this context, $\Delta BG$ is the additional rated variable term, $BG_2$ is in turn the value of the rated variable determined according to the second relationship, $BG_3$ is a value of the rated variable determined according to the third relationship, $(BG_3 - BG_2)$ is the rated variable differential value, and k is a scaling factor which has a value range from at least 0 to at maximum 1, wherein the scaling factor k is determined as a function of the differential rotational speed. The scaling factor k is preferably determined on the basis of a third characteristic curve, wherein the third characteristic curve has values for the scaling factor k as a function of the differential rotational speed. It is possible that the third characteristic curve is different than the first characteristic curve and than the second characteristic curve. However, an embodiment in which the third characteristic curve is selected to be identical to the second characteristic curve, or in which the second characteristic curve is used as a third characteristic curve for determining the scaling factor k, is particularly preferred. This has the advantage that the scaling of the additional rated variable term $\Delta BG$ is matched to the interpolation of the ignition time, with the result that, given an assumed linear relationship between the ignition time displacement and the displacement of the knocking limit, an additional rated variable term which fits the interpolated ignition time to an optimum degree is always selected. This makes it possible overall for the internal combustion engine to be operated with optimum enrichment, in particular with a mixture with maximum enrichment, but at the same time without a risk of knocking, at each selected ignition time.

In one preferred embodiment of the method, the quantity of fuel which is to be fed overall to the combustion chamber is determined by a rated variable setpoint value which is calculated, according to the equation presented below, as a sum of the interpolated value $BG_{int}$ for the rated variable and the additional rated variable term $\Delta BG$:

$$BG_{setp} = BG_{int} + \Delta BG \tag{4}$$

Here, $BG_{setp}$ is the rated variable setpoint value.

Within the scope of one preferred embodiment of the method, the value of the rated variable, which ultimately determines the quantity of fuel to be fed in, that is to say in particular the interpolated value of the rated variable $BG_{int}$ or the rated variable setpoint value $BG_{setp}$ is limited to a maximum value of 1 by a limiter. This advantageously ensures that in a transient state according to the method the internal combustion engine is not operated with a lean mixture, wherein the quantity of fuel which is fed in corresponds at minimum to the stoichiometric quantity of fuel.

There is preferably provision that the value of the rated variable provided to determine the quantity of fuel to be fed in is converted by a conversion function into a quantity of fuel to be fed in, in particular a quantity of combustion gas to be fed in, and/or into a variable which is suitable for actuating a fuel valve, in particular a mass flow of fuel or a mass of fuel to be fed in per stroke of a piston assigned to the combustion chamber.

Overall, within the scope of the method there is preferably provision that an additional quantity of fuel is introduced into the combustion chamber as a function of a difference between the instantaneous actual rotational speed of the internal combustion engine and the setpoint rotational speed. This additional quantity is preferably specified as a lambda setpoint value. Basically, it is possible to enrich a mixture in the combustion chamber until the internal combustion engine starts to knock. Therefore, if a load requirement is present, the internal combustion engine can be operated at its knocking limit in order to accelerate the turbocharger. If the actual rotational speed approaches the setpoint rotational speed, the additional enrichment is eliminated and the internal combustion engine is set again to reduced emissions in the steady-state fashion. By shifting the ignition time in the retarded direction, an even larger quantity of fuel can be introduced into the combustion chamber, since the adjustment of the ignition time in the retarded direction shifts the knocking limit. This accordingly provides the possibility of being able to inject even more fuel into the combustion chamber. This results in a clearly better load shift capability of the internal combustion engine and improved engine dynamics.

The object is also achieved, in particular, in that a control device is provided which is designed to carry out a method for operating an internal combustion engine having at least one turbocharger, wherein the control device is configured to feed to a combustion chamber of the internal combustion engine in a steady state a quantity of fuel according to a first predetermined relationship between a load requirement made of the internal combustion engine and a rated variable which is to be fed to the combustion chamber and determines the quantity of fuel, wherein a second predetermined relationship between the rated variable and the load requirement is stored in the control device, wherein according to the second relationship a larger quantity of fuel is assigned to a given load requirement than according to the first relationship, and wherein the control device is configured to determine the quantity of fuel fed to the combustion chamber in a transient state of the internal combustion engine on the basis of an interpolated value for the rated variable, wherein the interpolated value is obtained by interpolation between a value of the rated variable resulting from the first relationship and a value of the rated variable resulting from the second relationship. The control device is configured, in particular, to carry out a method according to one of the embodiments described above. The advantages which have already been explained with respect to the method are obtained with respect to the control device.

The control device is preferably embodied as an engine control unit for an internal combustion engine, in particular as a central engine control unit (Engine Control Unit—ECU).

It is possible for the method to be implemented permanently in an electronic structure, in particular in hardware, of the control device.

Alternatively it is possible for a computer program product to be loaded into the control device, said computer program product having instructions on the basis of which a method according to one of the embodiments described above is carried out when the computer program product runs on the control device.

In this regard, a computer program product is also preferred which has machine-readable instructions on the basis of which a method according to one of the embodiments described above is carried out when the computer program product runs on a computer device, in particular on a control unit of an internal combustion engine. A data carrier which has such a computer program product is also preferred.

The object is also achieved in that an internal combustion engine, preferably controlled on the basis of the rotational speed, is provided which has a control device according to one of the exemplary embodiments described above. The control device is configured here, in particular, to carry out a method according to one of the embodiments described above. This results, with respect to the internal combustion engine, in the advantages which have already been explained with respect to the method.

An exemplary embodiment of the internal combustion engine is preferred in which said engine is embodied as a gas engine. The internal combustion engine is particularly preferably embodied for operation with lean gas, that is to say in particular is embodied as a lean gas engine. The advantages which have already been explained with respect to the method are implemented in a particular way for such an exemplary embodiment of the internal combustion engine.

The internal combustion engine is preferably embodied as a reciprocating piston engine. In a preferred exemplary embodiment, the internal combustion engine serves to drive, for example, heavy land vehicles or watercraft, for example mining vehicles and trains, wherein the internal combustion engine is used in a locomotive or a power unit, or ships. It is also possible to use the internal combustion engine to drive a vehicle used for defense, for example a tank. An exemplary embodiment of the internal combustion engine is preferably also used in a stationary fashion, for example for the stationary supply of energy in an emergency power operation, continuous load operation or peak load operation, wherein in this case the internal combustion engine preferably drives a generator. A stationary application of the internal combustion engine for driving auxiliary assemblies, for example fire extinguishing pumps on drilling rigs, is also possible. Furthermore, application of the internal combustion engine in the field of the mining of fossil raw materials and, in particular, fuels, for example oil and/or gas, is possible. The use of the internal combustion engine in industry or in construction, for example in construction machinery or building machinery, for example in a crane or an excavator, is also possible. The internal combustion engine can be embodied as a diesel engine, as a petrol engine, but particularly preferably as a gas engine for operation with natural gas, biogas, special gas or some other suitable gas. In particular, if the internal combustion engine is embodied as a gas engine, it is suitable for use in a cogeneration plant for the stationary generation of energy.

The object is finally also achieved in that a motor vehicle is provided which has an internal combustion engine according to one of the exemplary embodiments described above. In this context, the advantages which have already been explained with respect to the method, the control device and the internal combustion engine are also implemented with respect to the motor vehicle.

The motor vehicle is preferably embodied as a passenger car, as a truck, as a utility vehicle, as a building machine, as a rail vehicle, in particular as a locomotive, shunting locomotive, power unit, traction unit or as a train. It is also possible for the motor vehicle to be embodied as a vehicle used for defense, for example as a tank.

A motor vehicle which is embodied as a watercraft, in particular as a ship or as a submarine, is particularly preferred. In this context, in particular in the case of a watercraft a setpoint rotational speed is typically predefined by an operator of the watercraft for the internal combustion engine.

It is also possible for the motor vehicle to be embodied as an aircraft, for example as an airplane, in particular as a propeller airplane, wherein it is possible for the internal combustion engine to serve, for example, to drive a propeller. In this case, a prescription of a setpoint rotational speed is also preferably provided.

A stationary system with an internal combustion engine according to one of the exemplary embodiments described above is also preferred. In the stationary system here, the internal combustion engine is preferably provided for operation with a variable rotational speed. The stationary system can be a device for generating power, a stationary pump which is provided, for example, for feeding raw materials, a fire extinguishing pump on a drilling rig or some other suitable stationary system.

The description of the method, on the one hand, and of the control device, the internal combustion engine and the motor vehicle, on the other, are to be understood as complementary to one another. Features of the control device, the internal combustion engine and the motor vehicle which have been explained explicitly or implicitly with respect to the method are preferably features of a preferred exemplary embodiment of the control device, of the internal combustion engine or of the motor vehicle individually or when combined with one another. Method steps which have been explained explicitly or implicitly with respect to the control device, the internal combustion engine and/or the motor vehicle are preferably steps of a preferred embodiment of the method individually or when combined with one another. The method is preferably distinguished by at least one method step which is conditioned by at least one feature of the control device, of the internal combustion engine or of the motor vehicle. The control device, the internal combustion engine and/or the motor vehicle are/is preferably distinguished by at least one feature which is conditioned by at least one method step of a preferred embodiment of the method.

BRIEF DESCRIPTION OF THE DRAWING

The invention will be explained in more detail below on the basis of the drawing, in which.

DETAILED DESCRIPTION OF THE INVENTION

Figure 1:
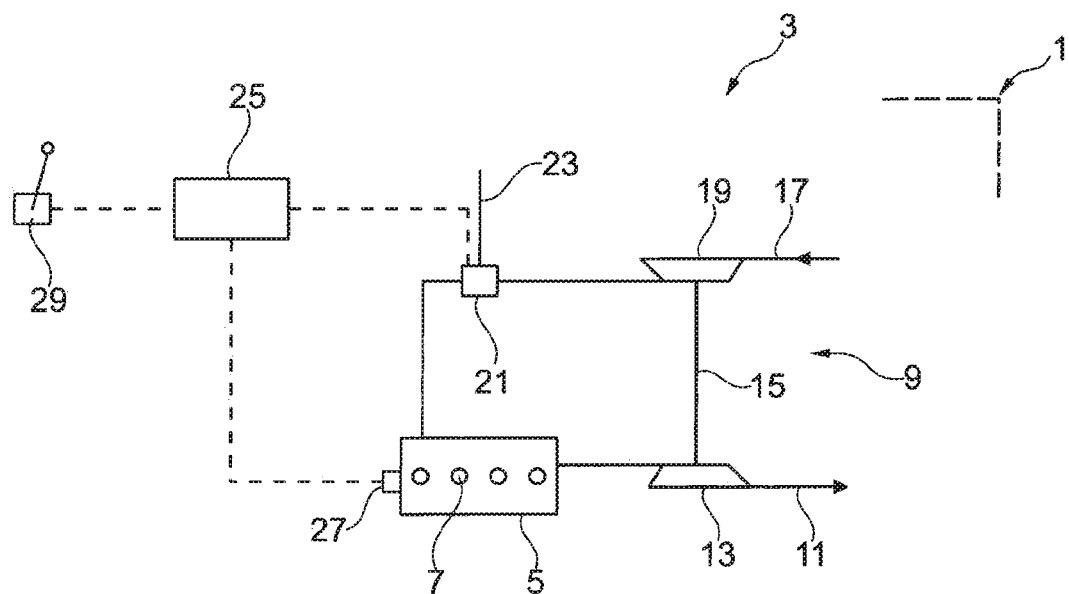
FIG. 1 shows a schematic illustration of an exemplary embodiment of a motor vehicle with an internal combustion engine.

FIG. 1 shows a schematic illustration of an exemplary embodiment of a motor vehicle 1 which has an internal combustion engine 3. The motor vehicle 1 is embodied, for example, as a watercraft, in particular as a ship. The internal combustion engine 3 has here an engine block 5 with at least one combustion chamber 7. The internal combustion engine 3 is preferably embodied as a reciprocating piston engine. In this context it is possible for said engine to have a multiplicity of combustion chambers, in particular four, six, eight, ten, twelve, sixteen, eighteen or twenty cylinders or more cylinders or another number of cylinders. It is possible for the internal combustion engine 3 to be embodied as an in-line engine, as a V-type engine, as a W-type engine or in some other suitable configuration.

The internal combustion engine 3 has a turbocharger 9 which has a turbine 13 which is arranged in an exhaust gas section 11 and is driven by a mass flow of exhaust gas flowing in the exhaust gas section 11, wherein the turbine 13 is operatively connected via a shaft 15 to a compressor 19 which is arranged in a charge air section 17, with the result that the compressor 19 can be driven by the turbine 13 via the shaft 15. An injection device 21 for a fuel which is embodied as combustion gas for operating the internal combustion engine 3 is arranged in the charge air section 17, downstream of the compressor 19 here. The combustion gas is fed to the injection device 21 via a combustion gas line 23. Alternatively it is possible for the injection device 21 to be arranged upstream of the compressor 19, that is to say ahead of the compressor 19. Various possible ways of injecting the combustion gas into the charge air are possible, specifically, in particular, as single point injection, preferably ahead of the compressor 19, as intake manifold injection downstream of the compressor 19, in particular as cylinder-specific multi-point injection in the individual combustion chambers 7, individually assigned intake manifold sections or else in the form of a direct injection into the individual combustion chambers 7.

At any rate, an adjustable, variable quantity of combustion gas can be fed to the combustion air by means of the injection device 21, wherein the injection device 21 can be actuated to prescribe the quantity of fuel which is fed to the combustion chamber 7.

The internal combustion engine 3 has a control device 25 which is preferably embodied as an engine control unit (ECU). The control device 25 is operatively connected to the injection device 25 in order to prescribe a quantity of fuel which is to be fed to the combustion chamber 7. Said control device 25 is also preferably operatively connected to a rotational speed sensor 27 for detecting an instantaneous actual rotational speed of the internal combustion engine 3. Furthermore, the control device 25 is operatively connected to a rotational speed prescription device 29, here a control lever, for prescribing a setpoint rotational speed for the internal combustion engine 3. The control device 25 is configured, in particular, to calculate a differential rotational speed between the setpoint rotational speed predefined by means of the rotational speed prescription device 29 and the actual rotational speed detected by means of the rotational speed sensor 27.

Known control devices are typically configured to permit internal combustion engines of this type which are embodied as gas engines to operate with the lowest possible emissions. It is disadvantageous here that in the case of load shifting no sufficient mass flow of exhaust gas is available to ensure a sufficiently dynamic response behavior of the turbocharger 9. Internal combustion engines of this type are therefore generally extremely slow-reacting and have a transient capability which is in need of improvement.

In order to overcome this disadvantage, the control device 25 illustrated in FIG. 1 is configured to carry out a method according to one of the embodiments described above, in particular an embodiment of the method such as is described below with respect to FIGS. 2 and 3. In this context, the control device 25 is configured, in particular, to actuate the injection device 21 as a function of the obtained differential rotational speed.

Figure 2:
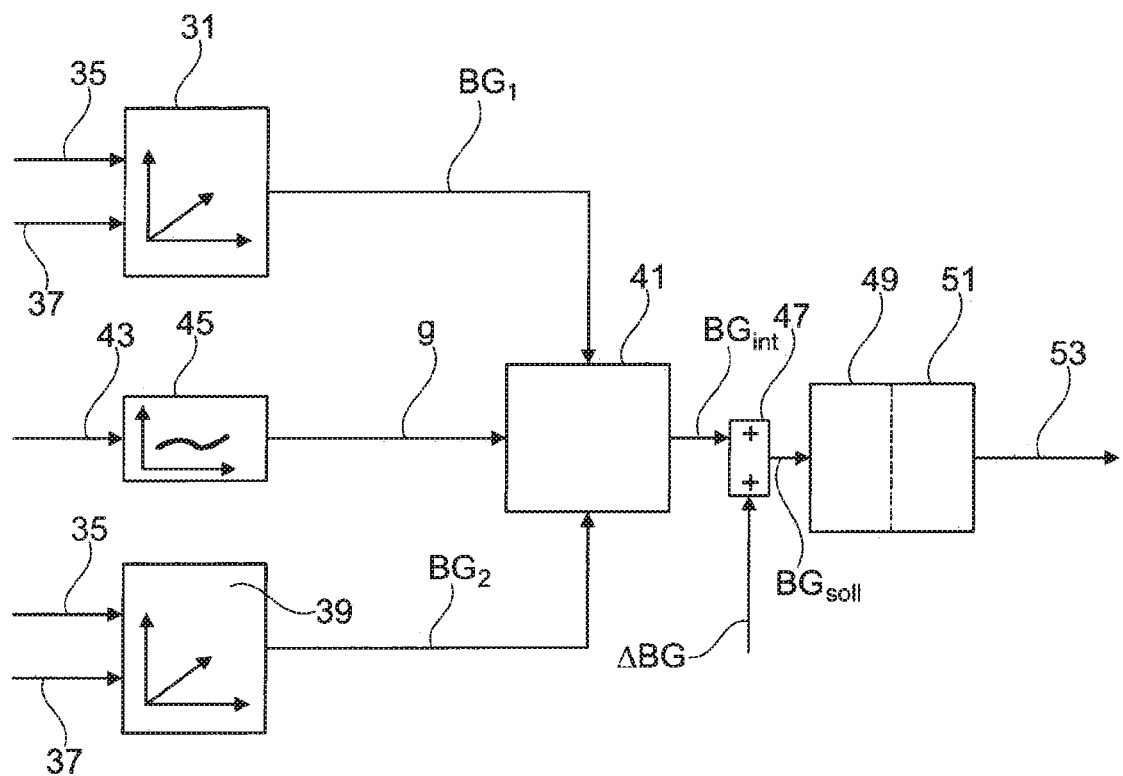
FIG. 2 shows a schematic illustration of a detail of an embodiment of the method.

FIG. 2 shows a schematic illustration of a detail of an embodiment of a method for operating an internal combustion engine, in particular the internal combustion engine 3 illustrated in FIG. 1. In this context, a first predetermined relationship 31 is provided in the form of a characteristic diagram which has values $BG_1$ for a rated variable which determines a quantity of fuel to be fed to the combustion chamber 7, as a function of rotational speed 35 and a torque 37 of the internal combustion engine 3. In this context, the first relationship 31 is optimized with respect to the lowest possible emissions of the internal combustion engine 3. In particular in steady states of the internal combustion engine 3, the quantity of fuel which is to be fed to the combustion chamber 7 is preferably determined by the values $BG_1$ which are determined for the rated variable according to the first relationship 31. The rated variable is here, in particular, a lambda setpoint value.

A second predetermined relationship 39 between the rated variable, that is to say the setpoint air ratio here, and the rotational speed 35 and the torque 37 is also provided in the form of a second characteristic diagram. A value $BG_2$ for the rated variable results from this second relationship 39 as a function of the rotational speed 35 and the torque 37. In this context, the second relationship 39 represents a knocking limit of the internal combustion engine 3. The values $BG_2$ of the rated variable according to the second relationship 39 are therefore lambda setpoint values at the knocking limit.

In order to improve the transient behavior of the internal combustion engine 3, in a transient state in which load shifting is present and, in particular, the rotational speed of the internal combustion engine 3 is to be increased, interpolation 41 is carried out between the value $BG_1$ determined for the rated variable according to the first relationship 31 and the value $BG_2$ determined for the rated variable according to the second relationship 39. Here, the interpolation takes place as a function of a rotational speed difference 43, wherein an interpolation factor g is read out according to a first characteristic curve 45 as a function of the differential rotational speed 43. The interpolation 41 is preferably carried out according to the equation (1) specified above.

This results in an interpolated value $BG_{int}$ for the rated variable.

It is possible that this interpolated value $BG_{int}$ of the rated variable is used per se to determine the quantity of fuel to be fed to the combustion chamber 7.

However, in the embodiment of the method illustrated here there is additionally provision that an additional rated variable term $\Delta BG$ is combined with the interpolated value $BG_{int}$ of the rated variable in a calculation element 47.

It is basically possible here that the additional rated variable term $\Delta BG$ is a multiplicative term which is multiplied by the interpolated value $BG_{int}$. However, in the exemplary embodiment illustrated here there is preferably provision that the calculation element 47 is embodied as an addition element, wherein the additional rated variable term $\Delta BG$ is embodied as an additive term and, in particular, as a summand which, according to the equation (4) specified above, is added to the interpolated rated variable $BG_{int}$.

The interpolated value $BG_{int}$ is preferably a lambda setpoint value. Correspondingly, the additional rated variable term $\Delta BG$ is preferably a lambda addition value.

A rated variable setpoint value $BG_{setp}$ results from the calculation in the calculation element 47. Said setpoint value $BG_{setp}$ is also a lambda setpoint value.

Since in the transient state the internal combustion engine 3 is not to be operated in a lean fashion, a limiting element 49 is preferably provided which limits the value of the rated variable setpoint value $BG_{setp}$ and therefore, in particular, the setpoint air ratio to 1, in particular by forming a maximum between the rated variable setpoint value $BG_{setp}$ and 1.

Furthermore, a conversion function 51 is preferably provided which converts the limited rated variable setpoint value into a value suitable for actuation of the injection device 21, for example into a fuel mass flow or a fuel mass to be injected per stroke of a piston which is assigned to the combustion chamber 7. Finally an actuation value 53 results from the conversion function 51 into which, in particular, a pressure and a temperature of the fuel are preferably input, said actuation value 53 being used for the actuation of the injection device 21 by the control device 25.

Figure 3:
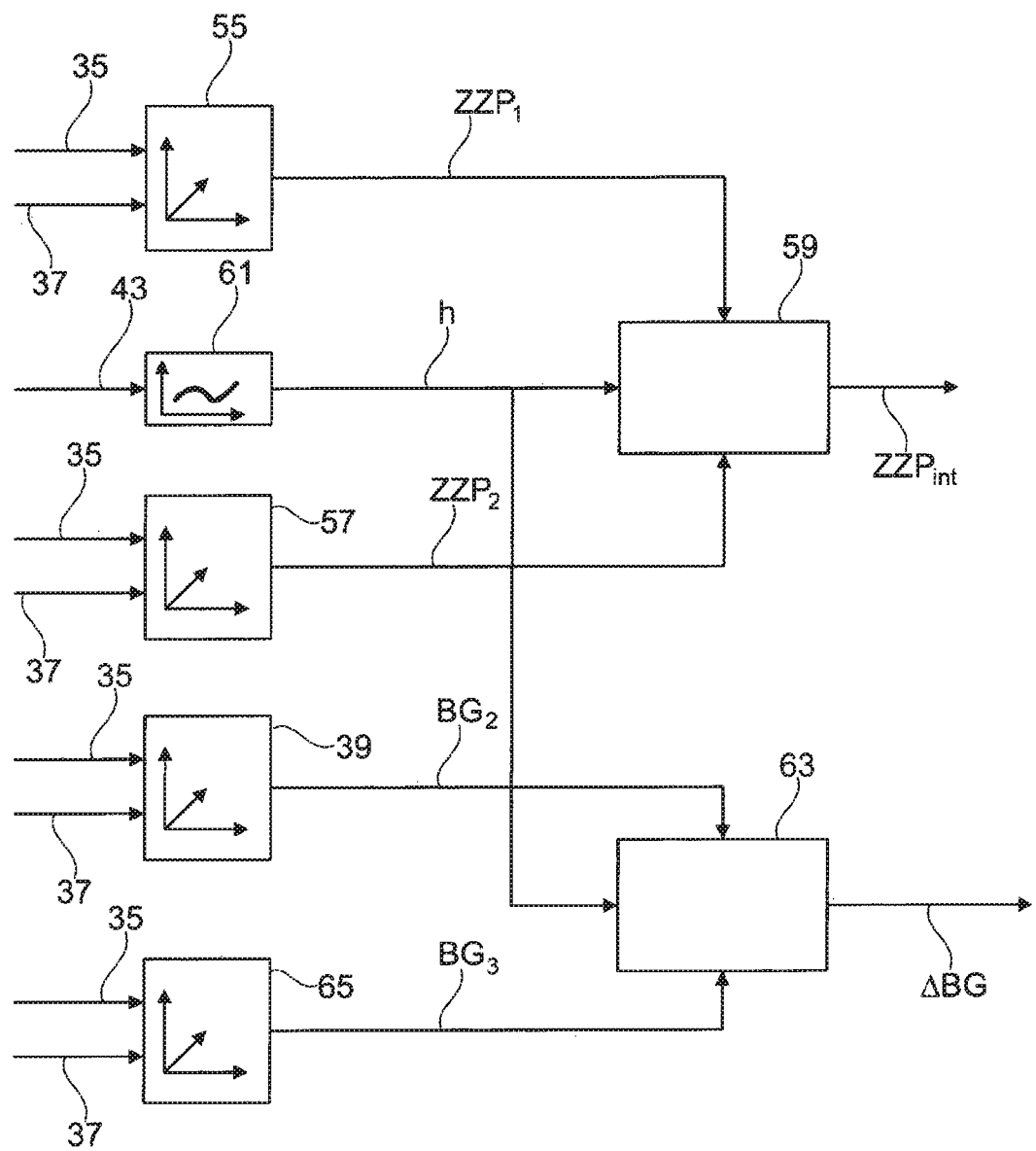
FIG. 3 shows a further schematic illustration of a detail of the embodiment of the method according to FIG. 2.

FIG. 3 shows a second illustration of a detail of the embodiment of the method according to FIG. 2. Identical and functionally identical elements are provided with the same reference symbols, with the result that in this respect reference is made to the preceding description. FIG. 3 illustrates the calculation of the additional rated variable term $\Delta BG$. Furthermore, the calculation of an interpolated ignition point $ZZP_{int}$ is illustrated.

There is a first predetermined ignition time relationship 55, embodied here in the form of a characteristic diagram which has values $ZZP_1$ for the ignition time as a function of the rotational speed 35 and the torque 37. Here, the first ignition time relationship 55 is used with optimization to the lowest possible emissions of the internal combustion engine 3. This first ignition time relationship 55 is used, in particular, in steady states of the internal combustion engine 3. The knocking limit which is represented by the second relationship 39 preferably relates to the first ignition time relationship 55 or the ignition times $ZZP_1$ which are provided according to this first ignition time relationship 55.

A second predetermined ignition time relationship 57 is provided, specifically again in the form of a characteristic diagram which has values $ZZP_2$ for the ignition time as a function of the rotational speed 35 and the torque 37. Here, the second ignition time relationship 57 is matched, in particular, to a technical limit of the internal combustion engine 3, preferably to a knocking limit thereof, wherein said ignition time relationship 57 has ignition times $ZZP_2$ which are the maximum which can be implemented without risk to the internal combustion engine 3. The characteristic diagram for the second ignition time relationship 57 is preferably obtained on a test bench. At any rate, the second ignition time relationship 57 comprises later ignition times, given fixed rotational speed 35 and fixed torque 37, than the first ignition time relationship 55.

Within the scope of the method, in a transient state of the internal combustion engine 3, in particular in the case of load shifting and increasing of the rotational speed, interpolation is carried out in an ignition time interpolation step 59 between the ignition time $ZZP_1$ according to the first ignition time relationship 55 and the ignition time $ZZP_2$ according to the second ignition time relationship 57. This is carried out by means of an ignition time interpolation factor h which is read out from a second characteristic curve 61 as a function of the differential rotational speed 43. In this context, the interpolation takes place, in particular, according to the equation (2) specified above. An interpolated value $ZZP_{int}$ for the ignition time with which the internal combustion engine 3 is actuated in the transient state, results from the ignition time interpolation step 59. In every case this brings about adjustment of the ignition time in the retarded direction, as a result of which the knocking limit of the internal combustion engine 3 is shifted to a relatively rich mixture. It is therefore possible to introduce an additional quantity of fuel into the combustion chamber 7.

For this purpose there is preferably provision that the additional rated variable term $\Delta BG$ is calculated by means of a third interpolation step 63, wherein interpolation is carried out here between the value $BG_2$ which is obtained for the rated variable according to the second relationship 39 and a value $BG_3$ which is obtained for the rated variable according to a third relationship 65. In this context, the third relationship 65 is also embodied here as a characteristic diagram which has values $BG_3$ for the rated variable as a function of the rotational speed 35 and the torque 37. In this context, the characteristic diagram 65 represents a knocking limit of the internal combustion engine 3 at the ignition time $ZZP_2$ which is determined according to the second ignition time relationship 57. The value $BG_3$ which is determined for the rated variable according to the third relationship 65 is here a value which relates to the knocking limit at the ignition time $ZZP_2$ which is adjusted in the retarded direction according to the second ignition time relationship 57, preferably by a lambda setpoint value.

For the interpolation in the third interpolation step 63, the ignition time interpolation factor h which is obtained according to the second characteristic curve 61 is used here as a scaling factor k, wherein the interpolation is carried out according to the equation (3) specified above. The equating of the ignition time interpolation factor h with the scaling factor k brings about optimum matching of the rated variable which is ultimately used to actuate the injection device 21 with the currently set ignition time. However, it is also alternatively possible for a scaling factor k which is determined independently, in particular according to a third characteristic curve, to be input into the third interpolation step 63.

The additional rated variable term ΔBG which results from the third interpolation step 63 is fed to the calculation element 47 according to FIG. 2.

Overall it becomes apparent that according to the method proposed here and by means of the proposed control device 25 the internal combustion engine 3 can be operated in a richer fashion in a transient state in the case of load shifting and increasing of the setpoint rotational speed than in a steady state in order to make available an increased mass flow of exhaust gas for the turbocharger. In this context, the ignition time can additionally be adjusted in the retarded direction in order to permit additional enrichment of the mixture in the combustion chamber 7. The interpolation steps which are provided bring about, on the one hand, softer control and, on the other hand, savings of fuel as well as a reduction in emissions. Furthermore, they cause the additional enrichment to be incrementally eliminated again when the actual rotational speed approaches the setpoint rotational speed, wherein the internal combustion engine 3 is then set again in a steady-state fashion to reduced emissions. In this context, it also becomes apparent that the internal combustion engine 3 is operated or configured, in particular, as an internal combustion engine which is controlled on the basis of the rotational speed.

The invention claimed is:

1. A method for operating an internal combustion engine having at least one turbocharger, comprising:
via a central engine control unit,
presetting a first predetermined relationship between an engine load requirement and a rated engine operating variable;
presetting a second predetermined relationship between a given engine load requirement and a given rated engine operating variable;
wherein the quantity of fuel according to the second relationship of the given load requirement is greater than the quantity of fuel according to the first predetermined relationship;
in a steady state of the internal combustion engine, injecting a quantity of fuel to a combustion chamber of the internal combustion engine based on the first predetermined relationship; and
in a transient state of the internal combustion engine, injecting the quantity of fuel fed to the combustion chamber based on an interpolated value of the rated variable obtained by interpolation between a value for the rated engine operating variable, resulting from the first predetermined relationship, and a value for the rated variable, resulting from the second predetermined relationship; and
further including:
carrying out the interpolation, via the central engine control unit, as a function of a differential rotational speed;
wherein the differential rotational speed is calculated as a difference between a setpoint rotational speed and an instantaneous actual rotational speed.

2. The method according to claim 1, further including:
via the central engine control unit,
optimizing the first predetermined relationship with respect to reduced emissions of the internal combustion engine.

3. The method according to claim 1, including using a characteristic diagram, in which values for the rated engine operating variable of the first predetermined relationship and the second predetermined relationship are stored as a function of a rotational speed and a torque of the internal combustion engine.

4. The method according to claim 1, including using a lambda setpoint value as the rated engine operating variable for the internal combustion engine.

5. The method according to claim 1, further including:
via the central engine control unit,
retarding ignition time, in a transient state of the internal combustion engine based on an interpolation between a first predetermined ignition time relationship, given between a load requirement of the internal combustion engine and the ignition time, and a second predetermined ignition time relationship, given between the load requirement and the ignition time;
wherein an additional rated engine operating variable is combined with the interpolated value of the rated engine operating variable;
wherein the additional rated engine operating variable is calculated based on scaling of a rated engine operating variable differential value;
wherein the rated engine operating variable differential value is calculated as a difference between a value of the rated engine operating variable, which results from a third predetermined relationship being given between the rated engine operating variable and the load requirement, and the value of the rated engine operating variable of the second predetermined relationship; and
wherein the third relationship represents a knocking limit of the internal combustion engine at the ignition time being/having been retarded.

6. The method according to claim 1, wherein the second relationship represents a knocking limit of the internal combustion engine.

7. An internal combustion engine having at least one turbocharger, comprising:
an engine block having a combustion chamber;
a fuel injection device; and
a control device having computer executable instructions stored on an electronic medium for:
presetting a first predetermined relationship between an engine load requirement and a rated engine operating variable;
presetting a second predetermined relationship between a given engine load requirement and a given rated engine operating variable;
wherein the quantity of fuel according to the second relationship of the given load requirement is greater than the quantity of fuel according to the first predetermined relationship;
in a steady state of the internal combustion engine, injecting a quantity of fuel to a combustion chamber of the internal combustion engine based on the first predetermined relationship; and
in a transient state of the internal combustion engine, injecting the quantity of fuel fed to the combustion chamber based on an interpolated value of the rated variable obtained by interpolation between a value for the rated engine operating variable, resulting from the first predetermined relationship, and a value for the rated variable, resulting from the second predetermined relationship; and wherein the control device carries out the interpolation as a function of a differential rotational speed; wherein the differential rotational speed is calculated as a difference between a setpoint rotational speed and an instantaneous actual rotational speed.

8. The internal combustion engine according to claim 7, wherein the internal combustion engine is a gas engine.

9. The internal combustion engine according to claim 8, wherein the internal combustion engine is a lean gas engine.

10. A motor vehicle, comprising:
an internal combustion engine having at least one turbocharger and including:
  an engine block with a combustion chamber;
  a fuel injection device; and
  a control device having computer executable instructions stored on an electronic medium for:
    preset/presetting a first predetermined relationship between an engine load requirement and a rated engine operating variable;
    preset/presetting a second predetermined relationship between a given engine load requirement and a given rated engine operating variable;
    wherein the quantity of fuel according to the second relationship of the given load requirement is greater than the quantity of fuel according to the first predetermined relationship;
  in a steady state of the internal combustion engine, injecting a quantity of fuel to a combustion chamber of the internal combustion engine based on the first predetermined relationship; and
  in a transient state of the internal combustion engine, injecting the quantity of fuel fed to the combustion chamber based on an interpolated value of the rated variable obtained by interpolation between a value for the rated engine operating variable, resulting from the first predetermined relationship, and a value for the rated variable, resulting from the second predetermined relationship; and
  wherein the control device carries out the interpolation as a function of a differential rotational speed; wherein the differential rotational speed is calculated as a difference between a setpoint rotational speed and an instantaneous actual rotational speed.

* * * * *